Jan. 14, 1958  G. A. MOYER  2,819,888
SECTIONAL CONTACTING TRAY
Filed Sept. 30, 1954  3 Sheets-Sheet 1

INVENTOR.
G. A. MOYER
BY *Hudson & Young*
ATTORNEYS

INVENTOR.
G. A. MOYER
BY Hudson & Young
ATTORNEYS

United States Patent Office 2,819,888
Patented Jan. 14, 1958

2,819,888

SECTIONAL CONTACTING TRAY

Golden A. Moyer, Bartlesville, Okla., assignor to Phillips Petroleum Company, a corporation of Delaware Application September 30, 1954, Serial No. 459,316

13 Claims. (Cl. 261—114)

This invention relates to vapor-liquid contacting apparatus. In one aspect it relates to vapor-liquid contacting apparatus for use in contacting hot, heavy oils at temperatures near cracking temperatures. In another aspect my vapor-liquid contacting apparatus has a broad application and is used in contacting other liquids and vapors or gases at any operational temperatures.

Vapor-liquid contacting apparatus which is used in stripping feed to high temperature vacuum distillation drums or in fractionations involving operations at high temperatures, that is, approaching coking temperatures, receive deposits of coke after prolonged operation. Cleaning of such vapor-liquid contacting apparatus in a tower is a slow and tedious operation, and is expensive because of labor requirements and length of time the equipment is out of operation. Breakage of the equipment frequently results because coke deposits are sometimes very hard. I have devised an apparatus for use in vapor-liquid contacting columns, especially for contacting columns treating hot, heavy oils at temperatures near cracking temperatures which apparatus is easy to clean of deposited coke. My apparatus is easily removed, in sections, from contacting columns for cleaning.

An object of my invention is to provide rugged vapor-liquid contacting apparatus for use in vapor-liquid contacting columns.

Yet another object of my invention is to provide vapor-liquid contacting apparatus for use in columns, which apparatus can be easily removed from the column for cleaning.

Yet another object of my invention is to provide a rugged vapor-liquid contacting apparatus which is relatively inexpensive to construct and to install in fractionating columns.

Another object of my invention is to provide rugged vapor-liquid contacting apparatus which is especially useful in columns treating heavy oils at temperatures near coking temperatures.

Yet another object of my invention is to provide a rugged vapor-liquid contacting apparatus which is relatively easy to remove from its operating position in contacting columns even when coated with substantial deposits of coke.

Still other objects and advantages of my invention will be realized upon reading the following description, which, taken with the attached drawing, forms a part of this specification.

I accomplish these and other objects and advantages by providing a vapor-liquid contacting tray assembly which is easily removable from a vapor-liquid contacting column comprising, a tray extending generally across the column and having a liquid receiving side and a liquid discharging side opposite said liquid receiving side, a plurality of elongated vapor-liquid contacting means extending across said column intermediate said liquid receiving and discharging sides, support plates attached to the ends of said vapor-liquid contacting means adjacent the walls of the column, a support element around the inner wall of said column for supporting said support plates, at least one wedge intermediate a pair of adjacent support plates at one end of said vapor-liquid contacting means, said wedge holding said support plates tightly against the walls of said column.

In the drawing, Figure 1 is a longitudinal section of a portion of a fractionating column employing the vapor-liquid contacting apparatus of my invention.

Figure 1:
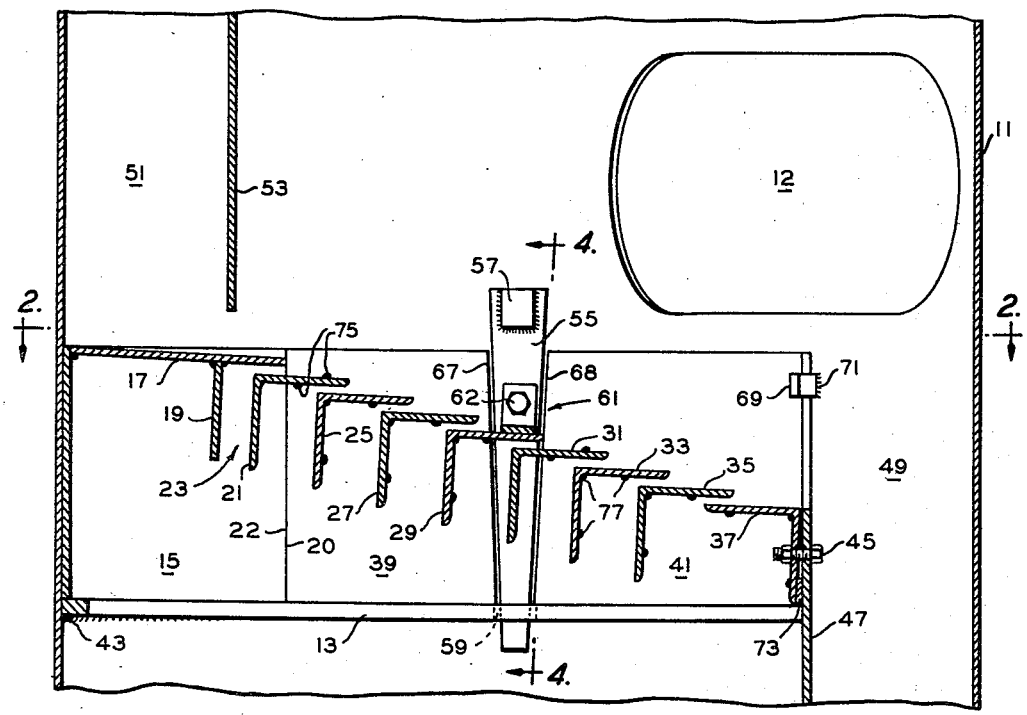

Referring now to the drawing and specifically to Figure 1 reference numeral 11 identifies a vertical wall of a more or less conventional vapor-liquid contacting column. Such a column can be square, elliptical or of other shape as well as circular. Such vessels however, are ordinarily circular in cross section. Reference numeral 12 identifies a manhole or manway such as is commonly provided at various levels on the outside wall of a fractionator. Reference numeral 13 identifies a ring which is called a support ring. As illustrated in Figure 1, this ring extends around only a portion of the inner surface of the wall 11 but, if desired, ring 13 can extend all the way around the vessel. This ring is preferably rigidly attached to the wall 11 by weld 43 and is intended to be so firmly and rigidly attached to the walls of the vessel as to support the weight of the vapor-liquid contacting apparatus to be described. A baffle plate 53 extends downward vertically from a tray, not shown, higher up in the column. This baffle 53 defines a downcomer 51 between the baffle 53 and the walls of the vessel. This downcomer 51 is intended to be a path down which treated liquid flows from a tray higher in the column to the contacting tray to be described.

Figure 2:
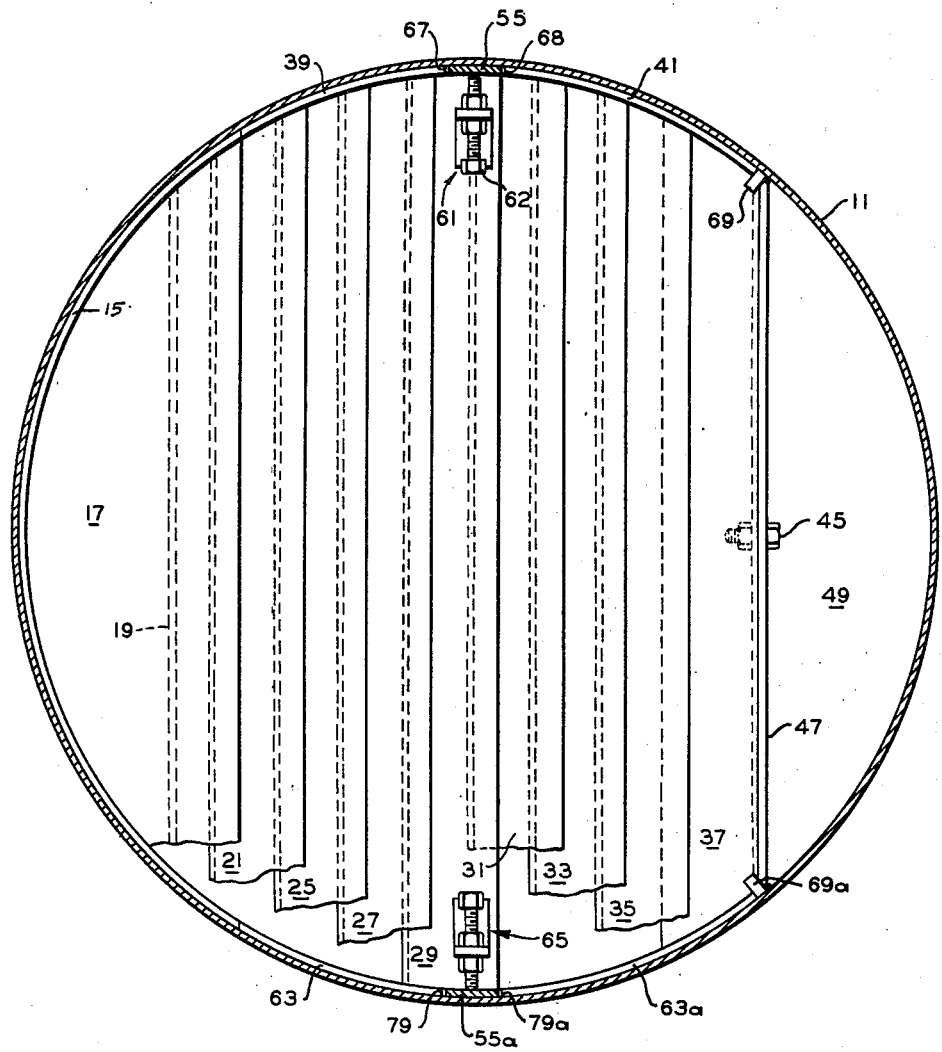
Figure 2 is a cross sectional view taken on a line 2—2 of Figure 1.

As a specific example of the vapor-liquid contacting apparatus of my invention, I will explain a tray suitable for installation in a column of circular cross section. As mentioned above, such trays are adaptable for use in columns of other cross sections and I do not wish to be limited specifically to columns of circular cross section. At the bottom of the downcomer 51 is a liquid receiving plate 17 which is a flat plate having one side circular for fitting around a portion of the inner wall of the vessel. The other side is a straight line. This plate 17 has a general form defined by an arc of a circle with the two ends of the arc being connected by a chord. This plate is attached rigidly to a vertically disposed plate 15 of circular shape disposed against the wall 11 of the vessel. Receiving plate 17 can be attached to the vertical plate 15 by any method desired such as welding, or braces bolted or riveted to each of the members or such other means as desired. However, I prefer that plate 17 be welded to plate 15. Extending in a generally downward direction, as shown, from the bottom side of plate 17 is a baffle plate 19 and plate 19 is preferably rigidly attached to plate 17 as by welding. Angle iron members 21, 25, 27, 29, 31, 33, 35 and 37 are vapor guide baffles and are positioned in the apparatus as shown. Angle irons 21, 25, 27 and 29 are fastened, by welding, at one end to a curved plate 39 and at their other ends to another curved plate 63 (Figure 2). The several angle irons positioned between plates 39 and 63 are so arranged as to provide vapor flow channels between the nearly horizontal sides of the several angle irons so that as can be seen in Figure 1 vapor rising upward between the lower legs, as for example, angle irons 25 and 27 will flow upward between these legs and then flow toward the right between the nearly horizontal sides of the angle irons in a direction from left to right.

Figure 3:
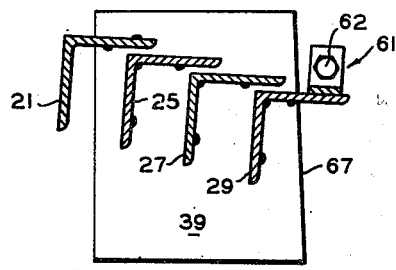
Figure 3 is a cross sectional view of a portion of my apparatus.

In Figure 1 is shown another section of contacting tray in general similar to the section illustrated in Figure 3 and this section is arranged in Figure 1 on the right hand side of the section just described. This second section of tray is composed of an end plate 41 to which are attached angle irons 31, 33, 35 and 37, as shown. Angle irons 31, 33 and 35 are positioned in the same general manner as angle irons 25, 27 and 29 are positioned on plate 39 but angle iron 37 is positioned in the reversed manner to provide a more or less vertical side for attaching a baffle 47 defining the downcomer 49 to a next lower tray.

The edge 22 of the vertical curved plate 15 is vertical. The edge 20 which is the left hand edge of plate 39 in Figure 1 is also vertical so that the edges 20 and 22 of plates 39 and 15, respectively, will provide well fitting surfaces. The left hand edge 68 of vertical plate 41 is sloping but in a direction opposite to that of edge 67 of plate 39. These plate edges 67 and 68 are so made as to be able to accommodate a wedge 55 between them. If desired, the plate 41 can extend further to the right than is shown in Figure 1 and, in fact, if desired, this plate can extend from its edge 68 around the right hand side of the column and on further around and be attached to the opposite ends of the angle irons 31, 33, 35 and 37, shown in Figure 2. Thus, plate 41 can, if desired, be substantially a half circle. However, by so constructing plate 41 a considerable amount of steel is used which is actually not necessary and I prefer to make plate 41 a small end plate as illustrated in Figure 1. In order that plate 41 can not move to the right a suitable bar or lug 69 is attached by welds 71 to the walls of the vessel, as shown. Another weld bar or lug 69a similar to lug 69 is welded to the walls 11 so that plate 63a, similar to plate 41, but at opposite ends of the angle irons 31, 33, 35 and 37 also cannot move to the right. With lugs 69 and 69a welded firmly in place and with wedges 55 and 55a inserted between plates 39 and 41, and 63 and 63a respectively, a rigid assembly is produced. I prefer to employ a second wedge 55a similar to wedge 55 in the opposite side of the tray so that when these two wedges are inserted tightly in their proper positions end plates 39 and 41 are rigidly fixed. The angle iron 29 which is attached to plate 39 and angle iron 31 which is attached to plate 41 are then in their proper position relative to each other. When these wedges are so inserted and hammered downward into place a very rigid and strong tray assembly results. When it is desired to remove this contacting tray it is merely necessary to remove the wedges and then the several sections of the tray can be lifted from their support ring 13 and taken through the manhole 12 outside the column. A lug or block 57 is welded to the top portion of wedge 55 as a bearing surface for hammering the wedge downward. This lug 57 is also used as a bearing surface when it is desired to remove the wedge from the position illustrated in Figure 1 by hammering upward on its bottom side.

Figure 4:
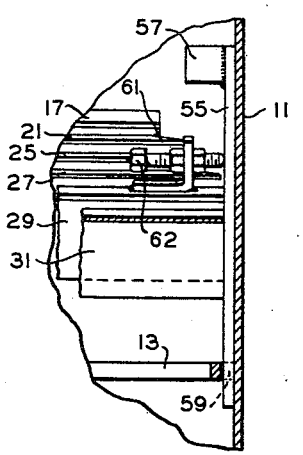
Figure 4 is a view taken along the line 4—4 of Figure 1.

While under some conditions it may not be necessary to provide other means for holding wedge 55 tightly in place, I find that it is preferable to employ an additional means for making certain that the wedge 55 does not become loosened. This other means is a bolt and lock nut assembly 61. This bolt and lock nut assembly can best be seen in Figure 4. This assembly is attached to the top surface of angle iron 29 as shown in Figure 4 and the bolt is threaded into position and then nuts on opposite sides of the support angle iron are so adjusted that the bolt cannot become loosened. Thus, by tightening this bolt 62 against wedge 55 and tightening the lock nuts the wedge 55 is held tightly in place. The wedge 55 is made sufficiently long that it extends through an opening 59 in support ring 13. This opening 59 also helps to keep wedge 55 in its proper position. Opening 59 shown in relation to the wedge is best shown in Figure 4. Another lock nut assembly 65 is illustrated on the end of angle iron 29 opposite lock nut assembly 61. The lock nut assembly 65 is for holding in place wedge 55a against the walls of the vessel, a sloping edge 79 of plate 63 and sloping edge 79a of plate 63a.

The angle iron 37, as mentioned above, is positioned in a manner opposite that of angle iron 35 so that the baffle plate 47 can be attached thereto by a bolt 45. Because the side of angle iron 37 adjacent plate 47 is not vertical, a spacer lug 73 is provided therebetween to hold the baffle 47 in a vertical position. Welds 75 are illustrated as attaching angle iron 21 to plate 39 while welds 77 are shown attaching angle iron 33 to plate 41. The other angle irons are attached to their supporting plates by welding but the weld points, as shown in the drawing, are not identified by reference numerals for clarity.

Figure 6:
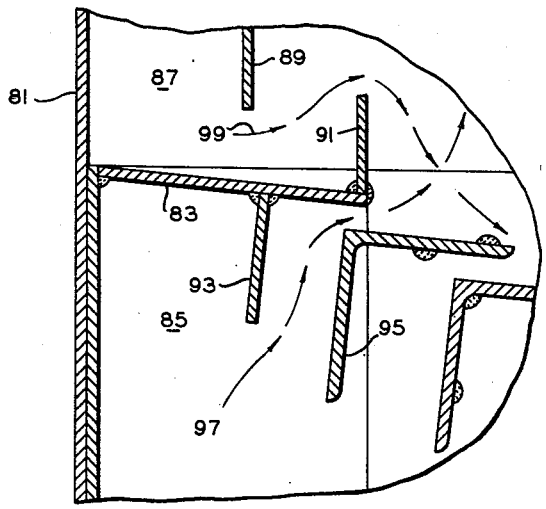
Figure 6 is a sectional view of still another embodiment of my invention.

In Figure 1 the apparatus of which is intended for use in contacting of thick, viscous and heavy oils with vapors at high temperatures a weir is not shown attached to the right hand end of plate 17. However, when it is desired to use this vapor-liquid contacting apparatus for treating less viscous materials such as gasoline and distillate oils and the like, it is preferred to provide a weir so as to provide a lake of liquid at the bottom end of baffle 53 as a trap against back flow of vapor up the downcomer 51. Such an arrangement is illustrated in Figure 6. In this figure reference numeral 81 identifies the vessel walls while plate 83 is a liquid receiving plate and baffle 89 provides a downcomer 87 between the baffle and the wall 81 of the vessel. A weir plate 91 is attached to the right hand end of plate 83 as shown thereby forming a dam for retaining a liquid on the left hand side of plate 91. Arrows 99 indicate the path of flow of liquid from the downcomer under the end of baffle 89 and over the weir. A curved plate 85 disposed on the vessel wall is the support means for the receiving plate 83 and this plate 83 is preferably attached to plate 85 by welding. A baffle plate 93 is attached to the underside of plate 83 for defining a vapor-flow path 97. In the operation of the apparatus of Figure 6 vapor following the vapor path 97 and the liquid following the liquid flow path 99 contact each other somewhere along the upper surface of angle iron vapor guide baffle 95.

Figure 5:
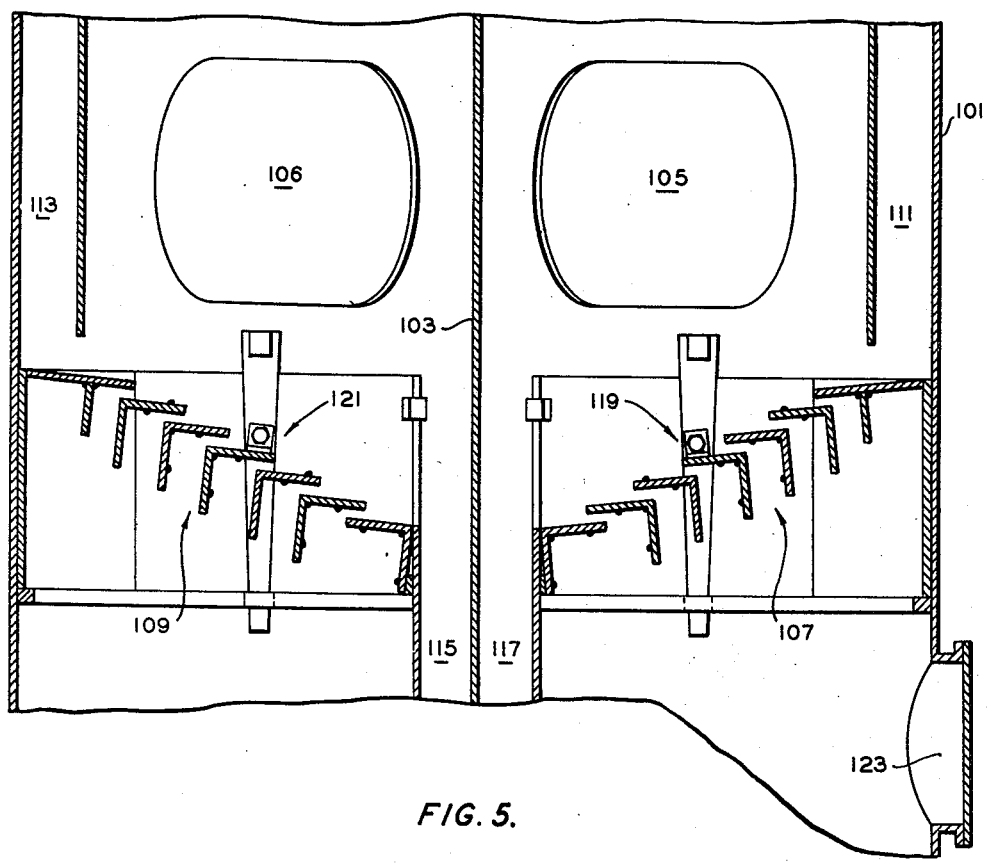
Figure 5 is a longitudinal sectional view of another embodiment of my invention.

While I have described the apparatus of my invention so far as being provided in a single path vessel, that is, one of relatively small diameter the idea is also used in still larger vessels. Some fractionating columns, especially those of large diameter, for example 10–12 feet, are actually two fractionators in parallel and such vessels are divided into two portions by a vertical plate assembly passing through the axis of the vessel. Thus, each half of the vessel acts as a separate fractionator as seen in Figure 5. In this figure vessel walls are identified by reference numeral 101 and a dividing plate assembly 103 is provided in the center of the vessel for dividing same into two portions. In the right hand side a downcomer space 111 and an assembly of angle irons with their wedge element holding the tray sections in place are shown. A lock nut assembly 119 is shown holding the wedge rigidly in place. A downcomer 117 is provided for passage of liquid from the top of tray 107 to a next lower tray. A manhole or manway 123 is shown below tray 107 for removing tray sections from tray 107 or from a lower tray. Manholes 105 and 106 are shown for removing sections of trays 107 and 109, or for removing sections of trays higher up in the column. In the left hand section of the column is a downcomer 113 defining a path of liquid flow onto the tray 109. This tray 109 is made up of several sections similar to the tray described in detail and illustrated in Figure 1. Tray 109, however, is for example, a left hand counterpart of tray 107. In case it is desired the dividing plate assembly 103 is made up of sections of small plates which are bolted to one another. In this case upon removing a section of plate 103 portions of contacting tray 109 can be removed from the column through manhole 105 and manhole 106 will then not be needed. Downcomer space 115 corresponds to downcomer 117. A lock nut assembly 121 is provided for holding the wedge in the left hand side of this column tightly between two sections of tray 109.

In the operation of this apparatus I will describe same relative to Figure 1. Liquid from a tray higher up on the column flows downward through downcomer 51 and is received on the top surface of the receiving plate 17. This liquid then flows to the right from the receiving plate onto the nearly horizontal surfaces of the upper portions of the several angle irons. Vapor from below flows upward and is directed between successive pairs of the several angle irons and flows upward therebetween and then makes a right angle turn and then flows horizontally from left to right between the several pairs of angle irons. On the surface of the contacting portion of the tray a liquid which flows from left to right is contacted by vapors issuing from between the angle irons. By the time the liquid reaches the right hand side of the tray the liquid has been efficiently contacted by vapor issuing from between the several angle irons. The liquid then flows over the angle iron 37 and goes down downcomer 49 to the next lower tray and column.

In order to make a very rigid tray assembly I prefer to use ordinary angle irons such as are used for construction purposes. In another case I use angle irons having sides 4 inches wide and ¼ inch thick. I find that such angle irons are sufficiently strong that when welded to their corresponding end plates a very rigid assembly is produced. Such an assembly even when covered with hard coke after the wedge is removed or jarred loose from its position by hammering does not bend or become otherwise distorted. In some cases it is desirable to employ merely flat plates bolted or welded together in the general form of angle irons but I prefer to use the regular commercially available angle irons.

I find that vapor liquid contacting trays constructed as hereinabove described are particularly useful for contacting heavy oils with vapors at very high temperatures, such temperatures as would be employed in cracking operations for the production of cracked distillates. Such operations cause deposition of coke in contacting apparatus and after prolonged periods of operation such apparatus ordinarily has to be shut down for cleaning. I find that the contacting apparatus made according to my invention is very strong and withstands many cleaning operations. However, if by accident or otherwise, a section of contacting tray is broken or bent a substitute section can be employed to replace the injured one. In this manner an entirely new tray does not have to replace a tray when only one section has been broken or otherwise destroyed.

While certain embodiments of the invention have been described for illustrative purposes, the invention obviously is not limited thereto.

Having disclosed my invention, I claim:

1. In a column for contacting liquid with a vapor, a vapor-liquid contacting tray assembly comprising, in combination, a removable tray extending in general across the column and having means for producing a plurality of generally horizontally flowing parallel sheets of vapor, means for introducing liquid to said tray assembly in the direction of flow of said parallel sheets of vapor, means for removing liquid from the side of said tray assembly opposite its points of introduction to said tray, said vapor flow producing means comprising a plurality of vapor guide baffles so disposed that their longitudinal axes are arranged horizontally and in a direction perpendicular to the general direction of liquid flow across the tray assembly, each vapor guide baffle extending substantially entirely across the column and being so disposed that vapor flowing therebetween and in a generally upward direction in said column issues from between each pair of adjacent baffles as said sheets of vapor, said tray assembly being divided into separate, distinct and removable sections, each section comprising at least one baffle support plate and at least one guide baffle extending across the column and affixed to said support plate in such a manner that when said removable sections are installed operatively in said column the baffle support plates are disposed against the column walls, and a wedge inserted between mutually adjacent edges of a pair of mutually adjacent support plates to hold the support plates rigidly against the column walls and said generally upwardly flowing vapor passes between adjacent pairs of said guide baffles as said parallel sheets of vapor.

2. In a column for contacting liquid with a vapor, a vapor-liquid contacting tray assembly comprising, in combination, a removable tray extending in general across the column and having means for producing a plurality of generally horizontally flowing parallel sheets of vapor, means for introducing liquid to said tray assembly in the direction of flow of said parallel sheets of vapor, means for removing liquid from the side of said tray assembly opposite its point of introduction to said tray, said vapor flow producing means comprising a plurality of vapor guide baffles so disposed that their longitudinal axes are arranged horizontally and in a direction perpendicular to the general direction of liquid flow across the tray assembly, each vapor guide baffle extending substantially entirely across the column and being so disposed that vapor flowing therebetween and in a generally upward direction in said column issues from between each pair of adjacent baffles as said sheets of vapor, said tray assembly being divided into separate, distinct and easily removable sections, each section comprising at least one baffle support plate and at least one guide baffle affixed thereto in such a manner that when said removable sections are installed operatively in said column the generally upwardly flowing vapor passes between adjacent pairs of said guide baffles as said parallel sheets of vapor, a wedge between mutually adjacent edges of a pair of mutually adjcent support plates, said wedge between support plates being adapted to hold the support plates rigidly against the column walls.

3. A liquid-gas contact tray having a liquid receiving side and a liquid discharge side opposite said liquid receiving side, comprising, in combination, a plurality of removable vapor-liquid contacting tray sections adaptable for installation in a vapor-liquid contacting vessel, said tray sections having separate end plates shaped to conform with the walls of the vessel, mutually adjacent edges of at least one pair of mutually adjacent contacting section end plates being beveled in such a manner as to accommodate a wedge therebetween to hold said end plates tightly against the inner wall of said vessel.

4. In a column for contacting liquid with a vapor, a vapor-liquid contacting tray assembly comprising, in combination, a removable tray extending in general across the column and having a liquid receiving side, and a liquid discharge side opposite said liquid receiving side, a plurality of inverted L-shaped baffles disposed entirely across said column in such a manner that their longitudinal axes are perpendicular to the direction of liquid flow across said tray, corresponding sides of said L-shaped baffles being substantially mutually parallel, one corresponding side of each of said L-shaped baffles facing upward, and the open angle of said L-shaped baffles facing said liquid discharge side of said tray assembly, a first support plate attached to one end of a first pair of the mutually adjacent above-mentioned baffles, a second support plate attached to the other end of said first pair of baffles, a third support plate attached to one end of a second pair of the mutually adjacent above-mentioned baffles, a fourth support plate attached to the other end of said second pair of baffles, said support plates being shaped so as to conform to and to fit tightly against the side walls of said column, the mutually adjacent edges of said first and third support plates being shaped to accommodate a wedge therebetween, the mutually adjacent edges of said second and fourth support plates being shaped to accommodate a wedge therebetween, a first wedge separating the shaped edges of said first and third support plates, a second wedge separating the shaped edges of said second and fourth support plates in such a manner as to force said support plates tightly against the sidewalls of said column, and support means immediately below said support plates to support the weight of said vapor-liquid contacting tray assembly.

5. In a column for contacting liquid with a vapor, a vapor-liquid contacting tray assembly comprising, in combination, a removable tray extending in general across said column and having a liquid receiving side and a liquid discharging side opposite said liquid receiving side, a plurality of individual angle irons disposed entirely across said column in such a manner that their longitudinal axes are horizontal and are perpendicular to the direction of liquid flow across the tray, corresponding sides of the angle irons being substantially mutually parallel, one corresponding side of each of the angle irons facing upward, and the open angle of said angle irons facing said liquid discharging side, a first support plate attached to one end of at least one of said baffles, a second support plate attached to the other end of said one baffle, a third support plate attached to one end of at least one other baffle and a fourth support plate attached to the other end of said other baffle, said other baffle being adjacent, operatively said one baffle, said support plates being shaped so as to conform to and to fit tightly against the walls of said column, mutually adjacent edges of said first and third support plates and of said second and fourth support plates being shaped so as to accommodate wedges therebetween, and wedges being inserted between said mutually adjacent edges of said first and third, and said second and fourth support plates to force said plates tightly against the walls of said column, and means attached to the walls of said column for supporting said support plates and tray assembly.

6. In a column for contacting liquid with a vapor, a vapor-liquid contacting tray assembly comprising, in combination, a tray extending in general across said column and having a liquid receiving side, and a liquid discharging side opposite said liquid receiving side, a plurality of individual angle iron baffles disposed entirely across said column in such a manner that their longitudinal axes are horizontal and are perpendicular to the direction of liquid flow across the tray, the angle iron baffles being positioned one below the other successively beginning at the liquid receiving side of the tray and in such a manner as to form a tray sloping downward from the liquid receiving side to the liquid discharge side and that vapor flowing between adjacent corresponding sides of the angle irons does so in parallel sheets and issues therefrom in the general direction of liquid flow across the tray, a liquid receiving plate on the liquid receiving side of said tray, said plate being substantially parallel to the corresponding sides of said angle iron baffles, said plate and said corresponding sides of the angle iron baffles defining the upper surface of the tray assembly, the line of juncture of the two sides of each angle iron baffle facing said liquid receiving side, vertically disposed end plates attached to the ends of said angle iron baffles, a vertically disposed side plate attached to the edge of said receiving plate, said vertically disposed end plates and said vertically disposed side plate being shaped so as to conform to and to fit tightly against the inner walls of said column, and a separate wedge intermediate a pair of said end plates at each end of said angle iron baffles to wedge said end plates and said vertically disposed side plate tightly against the inner wall of said column, and a support means attached to the inner wall of said column for supporting said tray assembly.

7. A vapor-liquid contacting tray assembly which is easily removable from a vapor-liquid contacting column, comprising, in combination, a tray extending in general across said column and having a liquid receiving side and a liquid discharging side opposite said liquid receiving side, a plurality of elongated vapor-liquid contacting means extending across said column intermediate said liquid receiving and discharging sides, at least a separate pair of mutually adjacent support plates attached to the corresponding ends of a mutually adjacent pair of said vapor-liquid contacting means adjacent the walls of the column, a support element around the inner wall of said column for supporting said support plates, and a wedge intermediate the support plates of one pair of said mutually adjacent support plates to wedge said support plates tightly against the walls of said column.

8. A vapor-liquid contacting tray assembly which is easily removable from a vapor-liquid contacting column, comprising, in combination, a tray extending in general across said column and having a liquid receiving side and a liquid discharging side opposite said liquid receiving side, a plurality of elongated vapor-liquid contacting means extendng across said column intermediate said liquid receiving and discharging sides, a separate support plate attached to mutually adjacent ends of each mutually adjacent pair of said vapor-liquid contacting means adjacent the walls of the column, a support element around the inner wall of said column for supporting said support plates, a separate wedge intermediate the support plates of each pair of mutually adjacent support plates to wedge said pairs of adjacent support plates tightly against the walls of said column, and means to hold said wedges in place against the wall of said column.

9. A vapor-liquid contacting tray assembly which is easily removable from a vapor-liquid contacting column, comprising, in combination, a tray extending in general across said column and having a liquid receiving side and a liquid discharging side opposite said liquid receiving side, a plurality of elongated vapor-liquid contacting means extendng across said column intermediate said liquid receiving and discharging side, support plates attached to the ends of said vapor-liquid contacting means adjacent the walls of the column, a support element around the inner wall of said column for supporting said support plates, a separate wedge intermediate a pair of adjacent support plates at the side of adjacent vapor-liquid contacting means to wedge said adjacent support plates tightly against the walls of said column, and means to hold said wedges in place against the wall of said column wherein said means to hold said wedges in place is a bolt-lock-nut assembly, said assembly being rigidly attached to an elongated vapor-liquid contacting means in such a manner that as the bolt is threaded tightly against said wedge, said wedge is held thereby tightly against the walls of said vessel, and lock nuts of said assembly being adapted to lock said bolt against unthreading from against said wedge.

10. A generally sloping liquid-gas contacting tray comprising, in combination, a plurality of transverse adjacent overlapping angle irons having a downcomer at the low side thereof, the longitudinal axes of said angle irons being substantially horizontal, corresponding sides of said angle irons being substantially parallel, one corresponding side of each angle iron facing upwardly, the line of juncture of the sides of each angle iron facing said liquid receiving side, said angle irons being attached to end plates, said end plates being shaped to conform to the inner walls of a containing vessel, mutually adjacent edges of a mutually adjacent pair of end plates being beveled to accommodate a wedge to hold said end plates tightly against the inner walls of said vessel.

11. A liquid-gas contacting tray having a liquid receiving side and a liquid discharge side, comprising, in combination, a plurality of removable vapor-liquid contacting sections adaptable for installation in a vapor-liquid contacting vessel, each of said sections comprising a plurality of transverse adjacent, overlapping angle irons extending entirely across said vessel, the longitudinal axes of said angle iron being substantially horizontal, and said angle irons being so disposed that the entire tray assembly slopes downward from the liquid receiving side to the liquid discharge side, the line of juncture of the sides of each angle iron facing said liquid receiving side and one corresponding side of each of said angle irons facing upward, support plates attached to the ends of said angle irons, said support plates conforming to the walls of said vessel, and a wedge disposed between mutually adjacent edges of a pair of mutually adjacent support plates to hold said support plates rigidly against the walls of said vessel.

12. A liquid-gas contacting tray having a liquid receiving side and a liquid discharge side, comprising a plurality of transverse, adjacent and overlapping angle irons, corresponding sides of said angle irons being substantially mutually parallel, and one corresponding side of each of said angle irons facing in general upwardly, the upwardly facing sides of the transversely disposed angle irons sloping downward in the direction of said liquid discharge side, the longitudinal axes of said angle irons being substantially horizontal, the line of juncture of the sides of each angle iron facing said liquid receiving side, said angle irons being attached to end plates, said end plates being shaped to conform to the inner walls of a containing vessel, mutually adjacent edges of a mutually adjacent pair of end plates being beveled to accommodate a wedge to hold said end plates tightly against the inner walls of said vessel.

13. A liquid-gas contacting tray having a liquid receiving side and a liquid discharge side, comprsing, a plurality of removable vapor-liquid contacting sections adaptable for installation in a vapor-liquid contacting vessel, each of said sections comprising a plurality of transverse, adjacent and overlapping angle irons extending entirely across the vessel, the longitudinal axes of said angle irons being substantially horizontal, and corresponding sides of said angle irons being substantially mutually parallel, one corresponding side of each of said angle irons facing in general upwardly, adjacent ends of at least one pair of said contacting sections being beveled in such a manner as to accommodate a wedge therebetween, a wedge disposed between said beveled ends of said sections, said wedge being adapted to hold said contacting sections rigid against movement in said vessel, the upward facing sides of the transversely disposed angle irons sloping downward in the direction of said liquid discharge side and the line of juncture of the sides of each angle iron facing said liquid receiving side.

References Cited in the file of this patent
UNITED STATES PATENTS

| | | |
|---|---|---|
| 2,059,044 | Seelig et al. | Oct. 27, 1936 |
| 2,401,569 | Koch | June 4, 1946 |
| 2,645,607 | Allen | July 14, 1953 |
| 2,698,746 | Reynolds | Jan. 4, 1955 |
| 2,757,915 | Huggins | Aug. 7, 1956 |

FOREIGN PATENTS

| | | |
|---|---|---|
| 1,048,712 | France | Aug. 5, 1953 |